United States Patent [19]

Pohl et al.

[11] Patent Number: 4,611,616

[45] Date of Patent: Sep. 16, 1986

[54] AXIALLY SEMISYMMETRICAL SUPERSONIC AIR INTAKE FOR REACTION ENGINES, PARTICULARLY SOLID FUEL RAM JET ROCKET ENGINES

[75] Inventors: Wulf-Dieter Pohl, Zorneding; Ernst-Otto Krohn, Lohmar, both of Fed. Rep. of Germany

[73] Assignee: Messerschmitt-Bölkow-Blohm GmbH, Fed. Rep. of Germany

[21] Appl. No.: 569,605

[22] Filed: Jan. 10, 1984

[51] Int. Cl.$^4$ .............................................. F02C 7/04
[52] U.S. Cl. ................................................. 137/15.1
[58] Field of Search ............................ 137/15.1, 15.2

[56] References Cited

FOREIGN PATENT DOCUMENTS 2012370 7/1979 United Kingdom ............... 137/15.1

Primary Examiner—Alan Cohan
Attorney, Agent, or Firm—McGlew and Tuttle

[57] ABSTRACT

An axially semisymmetrical supersonic air intake comprises a semiconical reaction engine displacer body having an air gap between the flat bottom of the air intake of the displacer body in the outer contour adjacent thereto of a missile or aircraft. The body transmits the boundary flow of the missile or aircraft and is bridged by a boundary layer plow. The body has a circumferentially distributed aperture on its surface in a zone of external normal shock which is produced during the subcritical conditions oscillating back and forth by which communication is established with the bleed air channel. The bleed air channels lead openings in the body to the flat bottom and may be subdivided by partitions in the interior of the body into individual parallel passages. The channels are formed by semiconical air baffles which are coaxial with the displacer body and taper in a direction opposite to the taper of the displacer body. The bleed air channels communicate with the inside of the boundary layer plow through outflow apertures at their ends which extend into the plow.

2 Claims, 3 Drawing Figures

AXIALLY SEMISYMMETRICAL SUPERSONIC AIR INTAKE FOR REACTION ENGINES, PARTICULARLY SOLID FUEL RAM JET ROCKET ENGINES

FIELD AND BACKGROUND OF THE INVENTION

This invention relates in general to reaction engines and in particular to a new and useful axially semisymmetrical supersonic air intake for reaction engines and particularly solid fuel ram jet rocket engines.

In aircraft missiles flying at high Mach number speeds, a supersonic diffuser transforms the high kinetic energy of the inflowing air into pressure energy, while decreasing the air velocity. In ram jet engines this is performed by the supersonic diffuser alone. The air thus compressed is then used in the combustion chamber for the combustion.

According to experience a particular intake disturbance occurs in supersonic diffusers, which is termed "humming" in the art. This disturbance occurs under highly "subcritical" conditions. The fact is that the compression shock which has already migrated into the zone in front of the cowl lip of the intake channel failed to assume a stable position and oscillates back and forth in a non-steady state.

This leads to strong variations in the flow and thus to a considerable drop of the mean effective pressure and of the rate of air flow. The disadvantage resulting therefrom decidedly require a suppression of this abnormal operating condition. Frequently, the remedy is found in providing the layout point somewhat in the supercritical zone, not in the theoretically advantageous critical operating point mentioned above. With such a design, the air intake is usually stable, the inflow resistance is low and the pressure gain is satisfactory.

A particular measure for securely eliminating the undesirable humming, even in extraordinary flight situations encountered with ram jet engines at supersonic speeds, is disclosed in German OS 28 01 119, and comprises providing bleed air apertures on the surface of the displacer body in the zone where the vertical external shock produced under strongly subcritical operating conditions is temporarily located and which oscillates back and forth. By allowing the boundary layer in the above-mentioned zone of the intake diffuser or the displacer body to flow off close ahead of the air intake plane, the compression shock is steadied and the humming is prevented. The bleed apertures in the surface of the displacer body communicate with two bleed channels which are separated from each other by a web and open into the boundary layer gap at both sides of the boundary layer plow. The boundary layer plow is designed for keeping the pressure in the boundary layer gap lower than on the surface of the displacer body, i.e. downstream of the first compression shock, but in any case lower than the pressure downstream of the produced vertical shock, where the air then flows away.

The prior art bleed device, aside from having particular advantages in steadying the produced compression shock, has also a certain drawback, namely that the relatively large amounts of air inflowing during the subcritical operating conditions are subjected to two abrupt 90° deflections, once as they enter the bleed channels through the bleed apertures, and then again as they leave the displacer body in the direction of the boundary layer gap and this introduces high resistance to flow and cause losses in the performance. In addition, if a boundary layer plow adjusted to the pressure is used, the outflow area still available at the bottom of the displacer body adjacent the boundary layer gap is too limited for the large amounts of outflowing air.

SUMMARY OF THE INVENTION

The present invention is directed to a design eliminating this drawback and providing a guidance of the relatively large amount of air through a bleed device, i.e. a guided flow into and out of the displacer body, producing minimum losses.

In accordance with the invention, there is provided an axially extending supersonic air intake for reaction engines which has an air intake cowl with a front opening in an intake plane. A semiconical displacer body extends out of the opening beyond the intake plane and terminates substantially in a front point and diverges from the front point toward the intake plane. The body has a flat bottom and a conical body which diverges toward the intake plane and it includes a cover sheet portion having a plurality of bleed openings. The body is provided with a plurality of spaced apart baffles which extend from the openings to the plow which advantageously define air channels for the flow of air in the openings through the channels into the plow.

With the inventive arrangement, bleed air is deflected during its flow into the displacer body and out of the displacer body into the interior of the boundary layer plow and only through about 45° each time, and in addition due to the rearward oblique direction of flow a large area is made available for the inflow into the inner space of the boundary layer plow since this plow flares in the rearward direction.

Accordingly, it is an object of the invention to provide an improved axially semicymmetrical supersonic air intake for reaction engines.

A further object of the invention is to provide an air intake for reaction engines which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
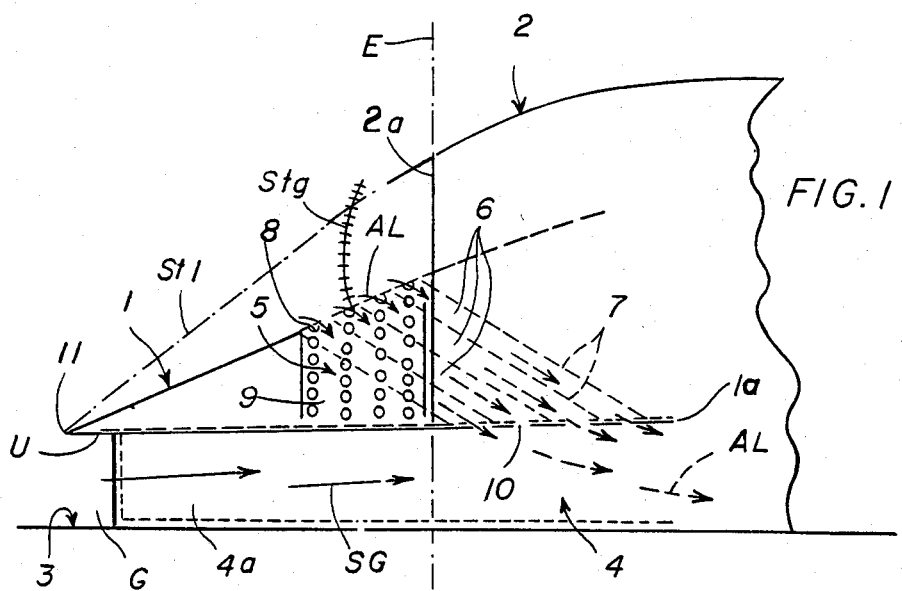
FIG. 1 is a side elevational view of an axially symmetrical supersonic air intake showing the supercritical operating conditions.
Figure 2:
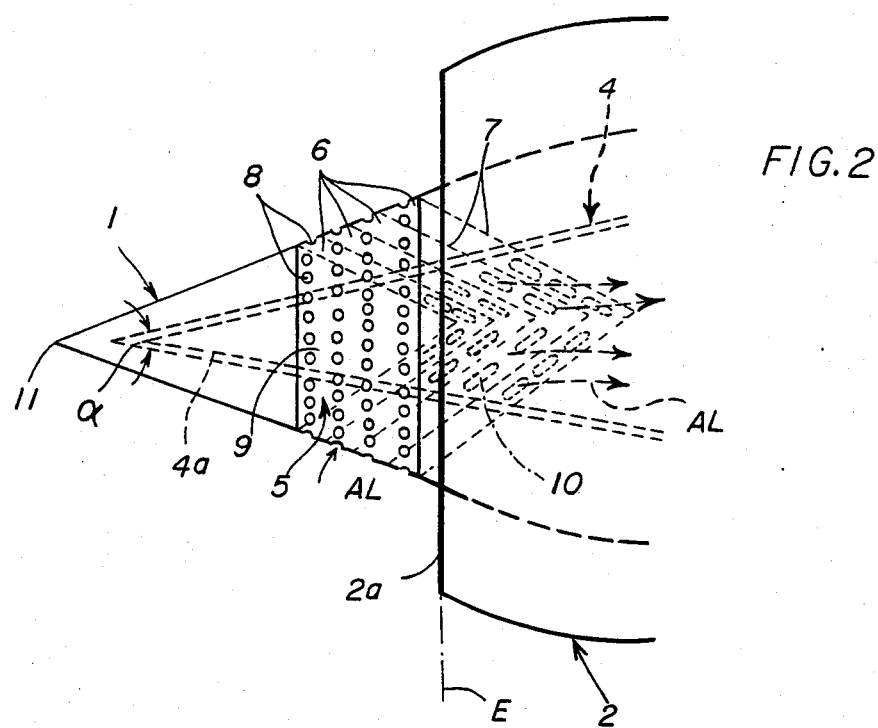
FIG. 2 is a top plan view of the device shown in FIG. 1.

Referring to the drawings in particular the invention embodied therein comprises an axially extending supersonic air intake for a reaction engine having an air intake cowl generally designated 2.

The shown air intake substantially comprises a semiconical displacer body 1 and an air intake cowl 2 whose front lip 2a determines the intake boundary layer flow SG between the missile body 3 and the underside U of the bottom 1a of the displacer body 1, a boundary layer plow 4 is provided within the boundary layer gap G.

In front of intake plane E, in the zone in which the external normal shock Stg oscillates during the period of subcritical conditions, a bleed device 5 is provided on or in diplacer body 1. The device comprises bleed apertures 8 which are provided in several rows in a cover sheet 9 on the surface of displacer body 1, a plurality of bleed air channels 6 which extend obliquely down toward the rear and are bounded by semiconical air baffles 7, and a plurality of rows of outflow apertures 10 which are provided in the bottom 1a of displacer body 1. Two of air baffles 7 connect upstream to a row of bleed apertures 8 and downstream to arrow-like arranged rows of outflow apertures 10. Through these outflow apertures 10, bleed air AL passes into the interior of boundary layer SG and thus bleed air channel 6 are coaxial with displacer body 1 and oriented so as to taper rearwardly, oppositely to displacer body 1.

Figure 3:
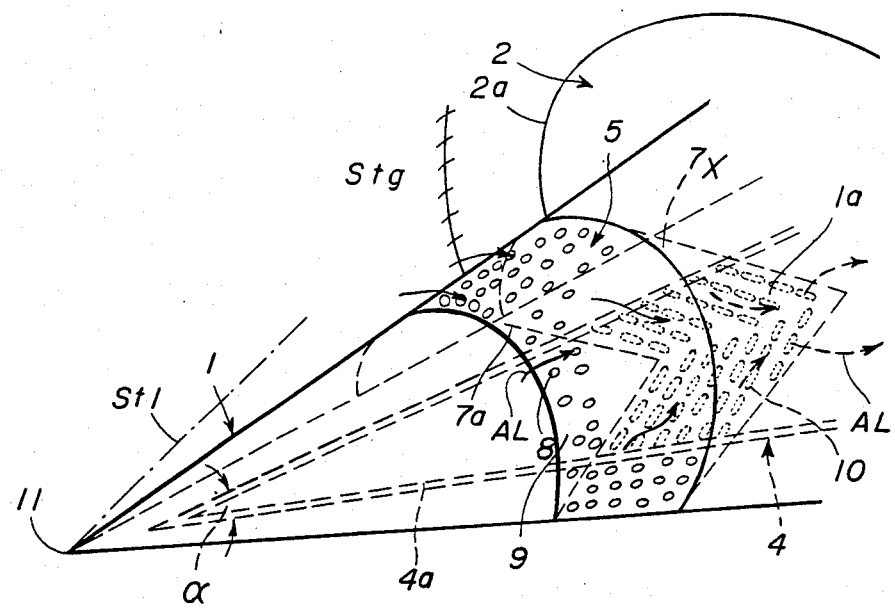
FIG. 3 is a perspective view of the air intake showing the subcritical operation conditions.

In FIG. 3, for reasons of clarity, only two air baffles are shown, namely the first one 7a in front, and the last one 7x in the rear. The particular advantage of bleed channels extending obliquely toward the rear is that boundary layer plow 4 grows wider in the rearward direction, so that a larger area for providing bleed apertures 10 is available behind bleed device 5 than directly over the height thereof. Another advantage is, as already mentioned above, that bleed air A,L or its flow is deflected twice only relatively slightly, at the inlets of bleed device 5 and at the outlets into the inner space of boundary layer plow 4.

While specific embodiments of the invention have been shown and described in detail to illustrate the application of the principles of the invention, it will be understood that the invention may be embodied otherwise without departing from such principles.

What is claimed is:

1. An axially extending supersonic air intake for reaction engines having an air intake cowl and a front opening in an intake plane, comprising a semiconical displacer body extending out of the opening beyond the intake plane terminating substantially at a point diverging from the front point toward said plane and having a flat bottom in a conical body diverging toward the plane and including a cover sheet portion having a plurality of bleed openings into said body disposed in the area of external normal shock produced during the subcritical conditions and which oscillates backwardly and forwardly, a boundary layer plow extending below said bottom, a plurality of spaced apart baffles extending from said openings through said flat bottom within said displacer body, said baffles defining channels leading from the openings into said plow, said baffles being semiconical and being arranged coaxial with said displacer body and taper in a direction opposite to the taper of said displacer body.

2. An axially extending supersonic air intake according to claim 1, wherein said plow diverges in a rearward direction.

* * * * *